United States Patent
Rakes

[15] 3,643,143
[45] Feb. 15, 1972

[54] DUAL SPEED BRUSHLESS DC MOTOR

[72] Inventor: Rodney G. Rakes, Bristol, Tenn.

[73] Assignee: Sperry Rand Corporation

[22] Filed: July 6, 1970

[21] Appl. No.: 52,330

[52] U.S. Cl..............................318/254, 318/305, 318/354, 318/502, 318/531
[51] Int. Cl......................................................H02k 29/00
[58] Field of Search..................318/254, 138, 696, 685, 301, 318/305, 337, 352, 354, 502, 531, 360

[56] References Cited

UNITED STATES PATENTS

| | | | |
|---|---|---|---|
| 3,453,514 | 7/1969 | Rakes et al.........................318/254 X |
| 2,790,125 | 4/1957 | Ryde...................318/254 X |
| 2,774,925 | 12/1956 | Wagner............................318/337 X |
| 3,207,967 | 9/1965 | Athey...............................318/352 X |
| 3,242,406 | 3/1966 | Tanaka...................................318/138 |
| 3,302,083 | 1/1967 | Tanaka et al............................318/138 |
| 3,319,104 | 5/1967 | Yasuoka et al.........................318/138 |

*Primary Examiner*—G. R. Simmons
*Attorney*—S. C. Yeaton

[57] ABSTRACT

A brushless DC motor contains a single, center-tapped stator winding energized through a double-pole, double-throw type of solid state switching means and a single photosensor for detecting rotor position. High-speed operation is achieved by energizing the stator winding through the center tap. Low-speed operation is achieved by energizing the entire stator winding.

2 Claims, 3 Drawing Figures

PATENTED FEB 15 1972
3,643,143
SHEET 1 OF 2
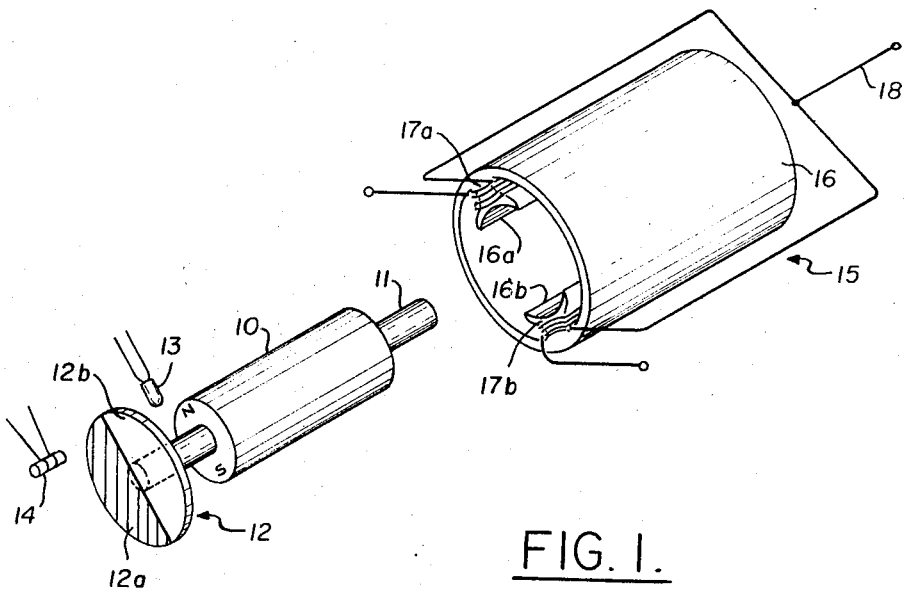
FIG. I.
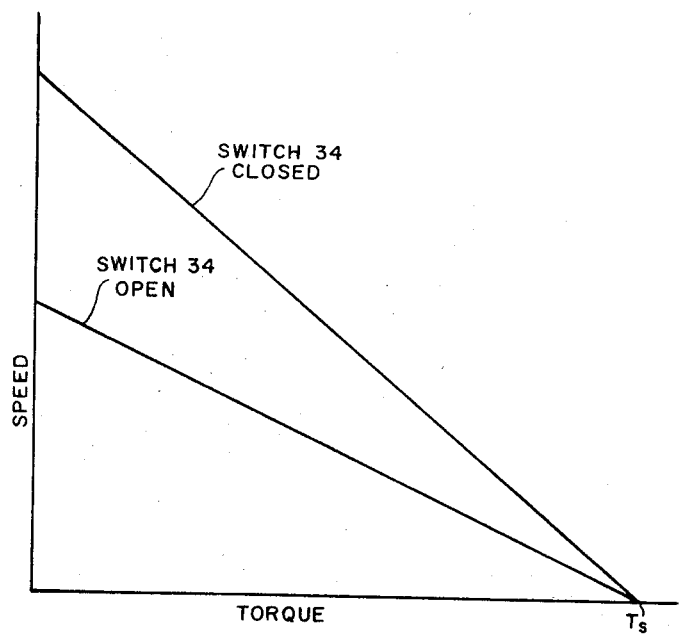
FIG. 3.
INVENTOR.
RODNEY G. RAKES
BY Joseph M. Roehl
ATTORNEY

INVENTOR.
RODNEY G. RAKES

DUAL SPEED BRUSHLESS DC MOTOR

BACKGROUND OF THE INVENTION

1. Field of the Invention

The invention relates to DC motors and more specifically to adjustable speed single sensor brushless DC motors.

2. Description of the Prior Art

A wide variety of brushless DC motors is known to the art. Prior art dual speed brushless DC motors utilize a separate set of windings for each desired speed. Such multiple windings, however, result in poor utilization of lamination window space since only a portion of the total wire in the stator windings is used for each speed.

The present invention requires only a single winding and thus provides improved efficiency since all of the wires are used for either speed.

SUMMARY OF THE INVENTION

The present invention utilizes the principle that the speed of a brushless DC motor is an inverse function of the number of stator winding turns. Optional high-speed operation is achieved by applying stator winding energizing voltages to only a portion of the winding.

BRIEF DESCRIPTION OF THE DRAWINGS

FIG. 1 is an exploded perspective functionally illustrating the type of motor to which the invention may be applied, FIG. 3 is a graph useful in explaining the operation of the invention.

DESCRIPTION OF THE PREFERRED EMBODIMENT

Figure 2:
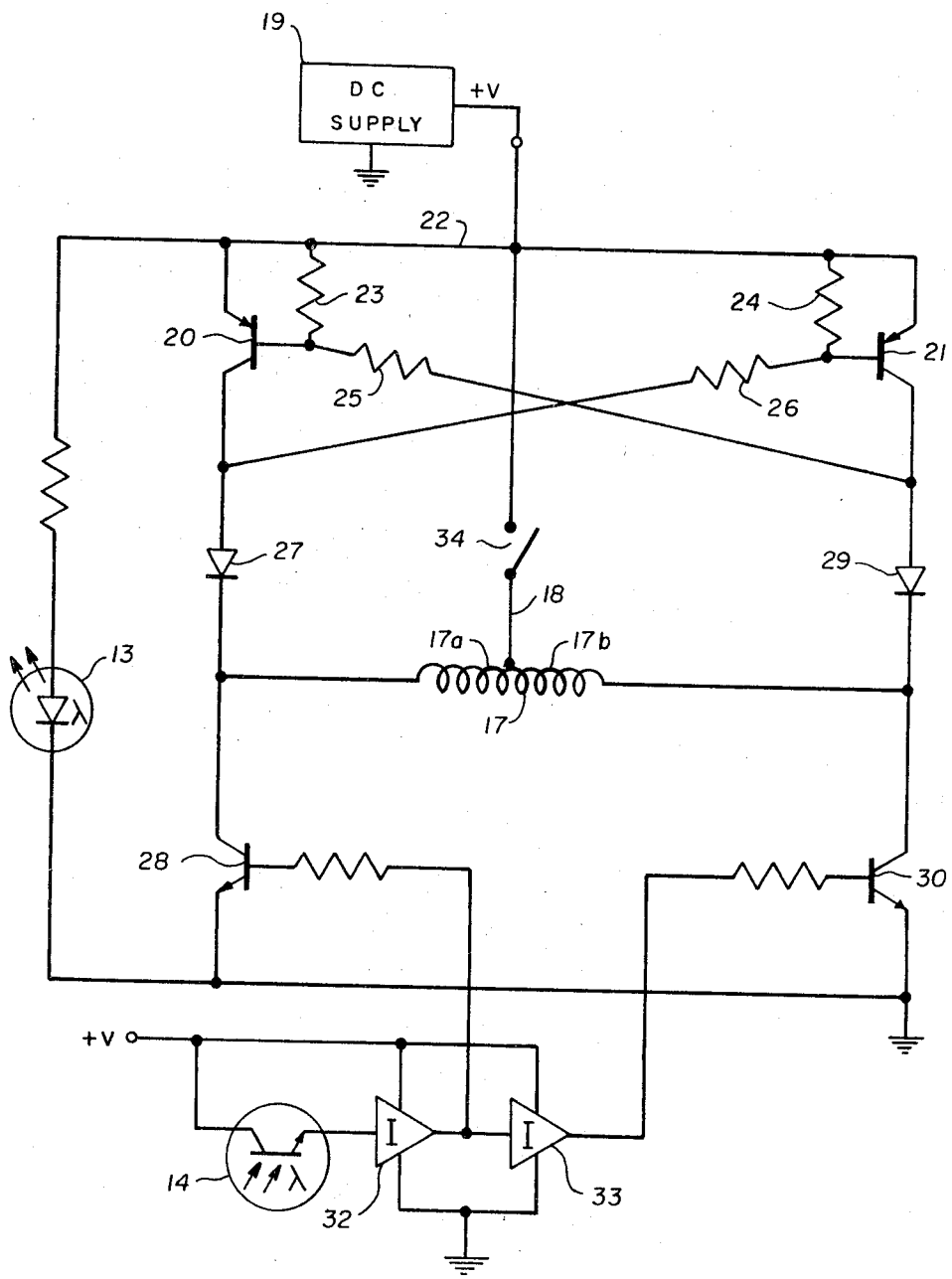
FIG. 2 is a circuit diagram of a motor employing the principles of the invention.

Single sensor brushless DC motors are known in the art. A typical motor of this type is disclosed in U.S. Pat. No. 3,543,514 issued to Rodney G. Rakes et al. and assigned to the present assignee.

The mechanical features of a motor of this type are depicted in FIG. 1. A permanent magnet rotor 10 is mounted on a shaft 11 which carries a disc 12 interposed between a lamp 13 and a photosensor 14. The disc 12 is divided into semicircular opaque and transparent sections 12a and 12b. In a manner known in the art, the rotor 10 is magnetized across its diameter so as to be attracted by magnetic fields established in the poles 16a and 16b by the stator windings 17a and 17b.

The pole faces are curved as indicated to conform to the outer surface of the rotor. The motor may be made self-starting, if desired, by making the pole faces eccentric with respect to the outer surface of the rotor so as to create tapered airgaps as described in U.S. Pat. No. 3,264,538.

As the rotor rotates, the light striking the sensor 14 is modulated in synchronism with motion of the rotor so as to maintain rotation in the proper direction and speed.

FIG. 2 is a schematic diagram of a switching circuit constructed in accordance with the principles of the present invention and useful in commutating a motor such as that of FIG. 1.

A source of light, such as a light emitting diode 13, is connected across the output of a power supply 19 and arranged to illuminate a photosensor 14 in accordance with the modulation provided by the sectored disc shown in FIG. 1.

The stator winding 17 is divided into first and second sections 17a and 17b by a tap 18.

First and second PNP-transistors 20 and 21 are connected directly to the positive side of the power supply 19. The emitter electrode of each of these transistors is connected to the power supply through a bus 22. The base electrode of each of these transistors is connected to the same bus through the resistors 23 and 24, respectively, and to the collector electrode of the other transistor through the resistors 25 and 26 respectively. The collector electrode of the transistor 20 is coupled through a diode 27 to an NPN-transistor 28. Similarly, the transistor 21 is connected through a diode 29 to an NPN-transistor 30. The transistors 28 and 30 are connected to the negative side of the power supply 19 through a bus 31.

The photosensor 14 is energized from the power supply 19 and actuates an inverter 32 and an inverter 33. When the photosensor 14 is illuminated, a positive signal is applied to the first inverter 32 which, in turn, supplies a zero level signal to the transistor 28. At the same time, the inverter 33 provides a high level signal to the transistor 30 which drives this transistor into conduction. When the photosensor is darkened, the output of the inverter 32 becomes a high level voltage which drives the transistor 28 into conduction. The same signal provides a zero level output voltage from the inverter 33 so as to drive the transistor 30 into cutoff. Thus, as the light is modulated, the transistor 28 and 30 are alternately driven into conduction and cutoff.

When the transistor 28 is driven into conduction, the voltage at the diode 27 approaches ground potential. This lowers the voltage on the base of the transistor 21 which in turn drives the transistor 21 into conduction. At the same time, the transistor 30 is driven to cutoff and a high voltage appears at the diode 29 which serves to cut off conduction in the transistor 20.

The stator winding may be energized across its entire length by maintaining the speed selection switch 34 in the open condition as depicted in FIG. 2.

The circuit of FIG. 2 may be considered as a bridge circuit in which the stator winding is connected between a first pair of diagonal bridge points and the power supply is connected between a second pair of diagonal bridge points. The four transistors 20, 21, 28 and 30 are arranged in individual bridge arms such that the transistors 20 and 30 are connected in a first pair of diagonally opposite bridge arms and the second pair of transistors 21 and 28 are connected in a second pair of diagonally opposite bridge arms. Thus, the two transistors in a given pair of diagonally opposite arms are both either in the conducting or in the nonconducting state at any given time.

When the speed selection switch 34 is closed, the tap on the stator winding is connected directly to the positive side of the power supply 19. This effectively bypasses the two transistors 20 and 21.

The operation of the circuit of FIG. 2 may be linked to a double-pole, double-throw switch in which the stator winding is subjected to currents alternately flowing in opposite directions.

When the speed selection switch 34 is open as indicated in FIG. 2, the motor operates in its low speed condition. When the photosensor 14 is illuminated under these conditions, current flows from the transistor 20 through the diode 27, the winding 17, the transistor 30, and to ground. When the light level at the photosensor 14 is changed, the condition of all transistors is changed and current then flows from the transistor 21, through the diode 29, the winding 17, the transistor 28 and finally to ground.

It will be obvious to those skilled in the art that this action applies a torque to the permanent magnet rotor shaft assembly and causes rotation of the light shield so as to modulate the light reaching the photosensor 14. Under these conditions, the output of the motor may be visualized by referring to the speed-torque diagram of FIG. 3. With the speed selection switch open, the motor operates in accordance with the lower curve in which the speed reaches a predetermined value at zero torque and progresses to the stalled condition at a point $T_s$.

When the switch 34 is closed, the transistors 20 and 21 are disabled and the transistors 28 and 30 provide the switching necessary to form the second set of motor characteristics depicted as the upper curve in the graph of FIG. 3. The tap on the winding 17 is connected directly to the voltage supply in this mode of operation. The two windings 17a and 17b are now energized alternately by the transistors 28 and 30.

The diodes 27 and 29 prevent damage to the transistors 20 and 21 and also prevent loading of the winding which is deenergized during alternate half cycles. For example, if the winding 17b is conducting at a given instant, the winding 17a will, at some point of rotation, have an EMF generated across it which is equal to the supply voltage. The polarity of this induced voltage will be such that the end of the coil 17a will be positive and thus add to the voltage from the supply 19. If the diode 27 were not included in the circuit, the induced voltage would cause conduction in the reverse direction through the transistor 20. This might damage the transistor 20.

Since the effective number of turns in the stator winding during the high-speed mode of operation is half that of the number of turns during the low speed mode of operation, the no-load speed will be essentially doubled when the speed selection switch 34 is closed.

The theory of operation is based on the fact that the speed of such a motor is given by the formula:

$$Speed = KE/\phi PZ$$

wherein:

$E$ = counter EMF
$\phi$ = flux per pole (determined by the strength of the permanent magnet)
$P$ = number of poles
$Z$ = number of turns
$K$ = a constant Thus it can be seen that the speed of such a motor is an inverse function of the number of turns on the stator winding.

The efficiency in both modes of operation is relatively high since all of the wire in the stator windings is used for either speed-torque characteristic. Thus, the window in the core lamination need be only large enough to accommodate a single winding.

It will be appreciated that specific type of transistors have been indicated as switching elements in the circuit of FIG. 2. However, the opposite conductivity type of transistor may be used in each instance if desired.

Similarly, although a light emitting diode has been indicated as a light source, any suitable type of lamp may be used for this purpose, if preferred.

While the invention has been described in its preferred embodiment, it is to be understood that the words which have been used are words of description rather than limitation and that changes may be made within purview of the appended claims without departing from the true scope and spirit of the invention in its broader aspects.

I claim:

1. A dual speed brushless DC motor comprising a stator winding, a permanently magnetized rotor rotatable in response to currents flowing in said stator winding, a DC power supply, means to sense the position of said rotor, a plurality of switching elements connected as separate arms of a bridge circuit, said sensing means providing a first switching signal whenever the rotor is within a first semicircular sector and a second switching signal whenever the rotor is within a second semicircular sector, said switching elements being arranged so that the switching elements in a first pair of diagonally opposite bridge arms are conductive when the sensing means produces a first switching signal and the switching elements in the second pair of diagonally opposite bridges arms are conductive when the sensing means produces a second switching signal, said power supply being connected between a first pair of bridge diagonal points and the stator winding being connected between the second pair of bridge diagonal points, said motor further including a center tap on said stator winding, speed selection means including a speed selection switch connected between one of said first bridge diagonal points and said center tap, said sensing means being connected to actuate adjacent switching elements connected to the other of said first bridge diagonal points so that said first switching signals are applied directly to one of said adjacent switching elements and said second switching signals are applied directly to the other of said adjacent switching elements.

2. A dual speed brushless DC motor comprising a stator winding, a permanently magnetized rotor rotatably in response to currents in said stator winding, a DC power supply, first and second transistors connected to one side of said power supply, third and fourth transistors connected to the other side of said power supply, first and second diodes interconnecting said first and third and said second and fourth transistors respectively, said stator winding being connected between the junction of said first diode and said third transistor and the junction of said second diode and said fourth transistor, a photosensor, means to illuminate said photosensor when said rotor is within a first given sector and to darken said photosensor when said rotor is within a second given sector, means to drive said first and fourth transistors into conduction when said photosensor is illuminated and to drive said second and third transistors into conduction when said photosensor is darkened, a center tap on said stator winding, and a speed selection switch connected between said center tap and said one side of the power supply.

* * * * *